United States Patent
Seigneurbieux et al.

(10) Patent No.: US 11,405,448 B1
(45) Date of Patent: Aug. 2, 2022

(54) SYSTEMS AND METHODS FOR ADAPTIVELY IMPROVING THE PERCEIVED QUALITY OF A VIDEO CONFERENCE BY PASSIVE USERS

(71) Applicant: Verizon Patent and Licensing Inc., Basking Ridge, NJ (US)

(72) Inventors: Pierre Seigneurbieux, Mountain View, CA (US); Satish Malalaganv Ramakrishna, Yellapur (IN); Michael Grupenhoff, Palo Alto, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/409,399

(22) Filed: Aug. 23, 2021

(51) Int. Cl.
*H04L 65/403* (2022.01)
*H04L 65/80* (2022.01)

(52) U.S. Cl.
CPC ............ *H04L 65/80* (2013.01); *H04L 65/403* (2013.01)

(58) Field of Classification Search
CPC . H04L 65/80; H04L 65/403; H04L 29/06476; H04L 12/1813; H04L 12/1831; H04N 7/15
See application file for complete search history.

(56) References Cited

U.S. PATENT DOCUMENTS

| | | | | |
|---|---|---|---|---|
| 6,963,353 | B1* | 11/2005 | Firestone | H04N 7/152 348/14.09 |
| 7,454,460 | B2* | 11/2008 | Ivashin | H04L 29/06027 709/204 |
| 10,044,783 | B2* | 8/2018 | Totzke | H04L 65/403 |
| 10,922,850 | B1* | 2/2021 | Harrison | G06N 3/10 |
| 2002/0193162 | A1* | 12/2002 | Walker | G07F 17/32 463/42 |
| 2017/0230439 | A1* | 8/2017 | Totzke | H04N 7/155 |
| 2020/0084057 | A1* | 3/2020 | Wadhwa | H04M 3/563 |

* cited by examiner

*Primary Examiner* — Oanh Duong

(57) ABSTRACT

A device may include a processor configured to monitor a user of a video conferencing application. The processor may be further configured to determine that the user corresponds to a passive user based on the monitoring; switch a setting for the video conferencing application for the user from real-time video to video streaming, in response to determining that the user corresponds to a passive user; generate a delay between receiving content via the video conferencing application and playing the content by the video conferencing application, wherein the delay progressively increases from no delay to a particular delay value over a time period, in response to switching the setting for the video conferencing application for the user from real-time video to video streaming; and play the received content using the video conferencing application based on the generated delay.

20 Claims, 8 Drawing Sheets

800 ⮕

| TIME 810 | RECEIVED PACKETS 820 | PLAYED PACKETS 830 | PLAYBACK BUFFER 840 |
|---|---|---|---|
| T | 101, 102, 103, 104 | 101, 102, 103, 104 | |
| T+1 | 105, 106, 107, 108 | 105, 106, 107 | 108 |
| T+2 | 109, 110, 111, 112 | 108, 109, 110 | 111, 112 |
| T+3 | 113, 114, 115, 116 | 111, 112, 113 | 114, 115, 116 |
| T+4 | 117, 118, 119, 120 | 114, 115, 116 | 117, 118, 119, 120 |
| T+5 | 121, 122, 123, 124 | 117, 118, 119 | 120, 121, 122, 123, 124 |

| TIME 910 | RECEIVED PACKETS 920 | PLAYED PACKETS 930 | PLAYBACK BUFFER 940 |
|---|---|---|---|
| T+X | 901, 902, 903, 904 | 851, 802, 853, 854 | 855, 856, 857,... |
| T+X+1 | 905, 906, 907, 908 | 855, 856, 857, 858, 859 | 860, 861, 862,... |
| T+X+2 | 909, 910, 911, 912 | 860, 861, 862, 863, 864 | 865, 866, 867,... |
| T+X+3 | 913, 914, 915, 916 | 910, 911, 912, 913, 914 | 915, 916 |
| T+X+4 | 917, 918, 919, 920 | 915, 916, 917, 918, 919 | 920 |
| T+X+5 | 921, 922, 923, 924 | 920, 921, 922, 923, 924 | |
| T+X+5 | 925, 926, 927, 928 | 925, 926, 927, 928 | |

FIG. 9

SYSTEMS AND METHODS FOR ADAPTIVELY IMPROVING THE PERCEIVED QUALITY OF A VIDEO CONFERENCE BY PASSIVE USERS

BACKGROUND INFORMATION

A video conferencing system may enable multiple users in different locations to interact using audio and/or video signals. For example, a user may initiate a videoconference session and invite other users to join the videoconference session. A user may join the videoconference session using a device, such as a computer device. The computer device may capture video of the user using a camera and/or capture the user's voice using a microphone. The captured video and/or audio may be sent over a network connection to computer devices associated with the other users that are participating in the videoconference session. Furthermore, the user may receive the captured video and/or audio of the other users using the network connection and play the received video and/or audio using a display device and/or a speaker. However, the network connection may be unreliable and cause delays in transmission of the video and/or audio content. Managing a video conference associated with an unreliable network connection may poses various challenges.

BRIEF DESCRIPTION OF THE DRAWINGS

FIG. 8 illustrates an exemplary switch from real-time video to video streaming according to an implementation described herein; and FIG. 9 illustrates an exemplar switch from video streaming to real-time video according to an implementation described herein.

DETAILED DESCRIPTION OF EMBODIMENTS

Figure 1:
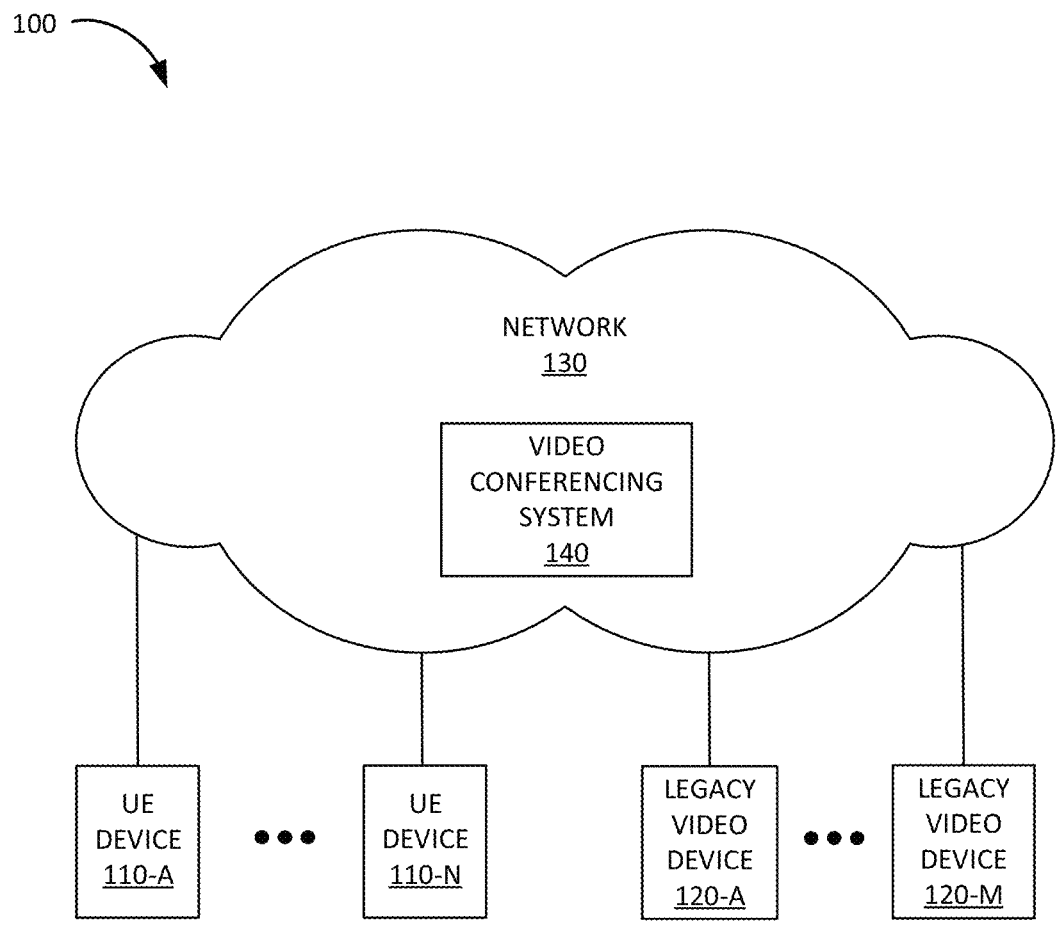
FIG. 1 illustrates an environment according to an implementation described herein.

The following detailed description refers to the accompanying drawings. The same reference numbers in different drawings identify the same or similar elements.

One of the main goals of a video conference session may be to enable speakers to communicate and exchange ideas with little perceived delay in video and/or audio signals between the parties participating in the video conference session. Therefore, video conferencing platforms may be designed to optimize perceived quality of audio and/or video content of all participants while maintaining the minimum possible signal latency between users. However, a video conferencing platform tuned for maximizing the experience of active users may negatively impact passive users using a marginal network connection who may experience interruptions and/or delays.

Because a video conference session is optimized for minimal end-to-end delay in order to facilitate seamless conversations between participants, communication between the participants is implemented as real-time video, which prevents the use of client-side buffering to improve call quality of users connecting over challenging networks. Such users may experience limited throughput, high jitter, random packet loss, and/or other types of quality or reliability issues. However, in many video conferences, a small number of participants may be speaking while most other participants are passive and listening for significant lengths of time during the meeting. If a passive user is associated with a poor network connection, the passive user's experience may be improved by switching the playback of received content for the passive user from real-time video to video streaming with buffered playback.

Implementations described herein include an adaptive method to enable buffering of video and/or audio data of passive users participating in a video conferencing session. A user equipment (UE) device, such as a smart phone, laptop, desktop, and/or another type of computer device with a network connection and video conferencing capabilities, may include a video conferencing application configured to monitor user behavior during a video conference session. The video conferencing application may determine whether the user corresponds to a passive user. As an example, a user may be determined to be a passive user if the user activates a mute setting for a microphone and/or turns off a camera. As another example, a user may be determined to be a passive user using a computer vision analysis of a video stream of the user captured by a camera. In some implementations, if a user is determined to be a passive user, the user may be prompted to select a passive mode and the user may be designated as a passive user in response to receiving a selection of the passive mode from the user. In other implementations, the user may be automatically designated as a passive user in response to determining the user as a passive user.

If the video conferencing application designates the user as a passive user, the video conferencing application may switch a setting for the video conferencing application for the user from real-time video to video streaming by generating a delay between receiving content and playing the content. The delay may progressively increase from no delay to a set delay value over a time period. While generating the delay, the video streaming application may progressively fill a play buffer with packets that have been received and not played, store received packets in the play buffer, and decode and play the packets from the play buffer.

The play buffer may enable the video conferencing application to compensate for an unreliable network connection that experiences interruptions or delays. For example, the video conferencing application may determine that a received packet has been corrupted and/or that a packet has not been received and may send, in response, a request to the sending device to resend the packet. Thus, a corrupted or missing packet may be resent and received in the play buffer before the content included in the packet is decoded and played. Without such a sufficiently sized play buffer, a retransmission mechanism for resending corrupted or missing packets may not be effective.

The video conferencing application may continue to monitor the user's behavior and may maintain the designation of the user as a passive user unless the video conferencing application determines that the user has switched from being a passive user to an active user. As an example, a user may be determined to be an active user if the user deactivates a mute setting for a microphone and/or turns on a camera. As another example, a user may be determined to be an active user using a computer vision analysis of a video stream of the user captured by a camera. As another example, a user may deactivate a selection of a passive user status.

In response to determining that the user has switched from being a passive user to an active user, the video conferencing application may designate the user as an active user and switch the setting for the video conferencing application for the user from buffered video streaming back to real-time video. In order to catch up to the real-time video and audio, the video conferencing application may speed up the playing of the received content from the playback buffer until the content being played is caught up to the real-time video and audio being received by the video conferencing application. For example, the content from the buffer may be played at up to 1.25 times the normal speed until the played content is caught up to the real-time content being received. Furthermore, the video conferencing application may skip playing periods of silence in video/audio segments while catching up to the real-time video/audio. Additionally, the video conferencing application may skip certain video frames in the video stream while catching up to the real-time video, such as a predicted picture video frames (P-frames, B-frames, etc.) that do not include changes greater than a change threshold.

A video conferencing system may manage video conferencing sessions associated with the video conferencing application running on UE devices. Additionally, a user may connect to a video conference managed by the video conferencing system using a legacy video device. The legacy video device may include, for example, a camera, a microphone, a speaker, a display device, and a network interface to connect to the video conferencing system using a network connection. The legacy video device may not include the capability to install and run a video conferencing application configured to monitor user behavior during a video conference session. Thus, the video conferencing system may perform the user behavior monitoring, detection and designation of a passive user status, and/or switching the user status back to an active user status, for the legacy video device. In some implementations, the video conferencing system may also maintain a playback buffer for the legacy video device.

FIG. 1 is a diagram of an exemplary environment 100 in which the systems and/or methods described herein may be implemented. As shown in FIG. 1, environment 100 may include UE devices 110-A to 110-N (referred to herein collectively as "UE devices 110" and individually as "UE device 110"), legacy video devices 120-A to 120-M (referred to herein collectively as "legacy video devices 120" and individually as "legacy video device 120"), a network 130 and a video conferencing system 140.

UE device 110 may include any device with video conferencing capabilities, such as a display device, a speaker, a camera, a microphone, and a network interface for wireless and/or wired communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a gaming system; and/or any other type of computer device with wireless or wired communication capabilities and a user interface configured for video conferencing. UE device 110 may include a video conferencing application enabled to participate in video conferencing sessions managed by video conferencing system 140. The video conferencing application may be configured to identify a passive user participating in a video conferencing session and enable buffering of video and/or audio data received via the video conferencing session.

Legacy video device 120 may include a device that includes a display device, a speaker, a camera, a microphone, and a network interface for wireless and/or wired communication functionality. Legacy video device 120 may be enabled to participate in video conferencing sessions managed by video conferencing system 140. Video conferencing system 140 may be configured to identify a passive user, associated with legacy video device 120 and participating in a video conferencing session and enable buffering of video and/or audio data received via the video conferencing session on behalf of legacy video device 120.

Network 130 may include a local area network (LAN), a wide area network (WAN), a metropolitan area network (MAN), an autonomous system (AS) on the Internet, an optical network, a cable television network, a satellite network, an ad hoc network, an intranet, or a combination of networks. UE devices 110 and/or legacy video devices 120 may connect to network 130 using a wired connection (e.g., an electrical and/or optical connection, etc.) or a wireless connection (e.g., a WiFi connection, a cellular wireless connection, etc.).

Network 130 may include video conferencing system 140. Video conferencing system 140 may manage video conferencing sessions for UE devices 110 and/or legacy video devices 120. For example, a user of UE device 110 and/or legacy video device 120 may request to initiate a video conferencing session by connecting to video conferencing system 140. The user may then, via video conferencing system 140, invite other users to join the video conferencing session. Video conferencing system 140 may manage the video conferencing session by organizing video and/or audio content from each participating UE device 110 and/or legacy video device 120 into a combined video stream for each participating user and sending the combined video stream to each other participating UE device 110 and/or legacy video device 120. Furthermore, video conferencing system 140 may be configured to identify a passive user, associated with legacy video device 120 and participating in the video conferencing session, and enable buffering of video and/or audio data received via the video conferencing session for legacy video device 120.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100.

Figure 2:
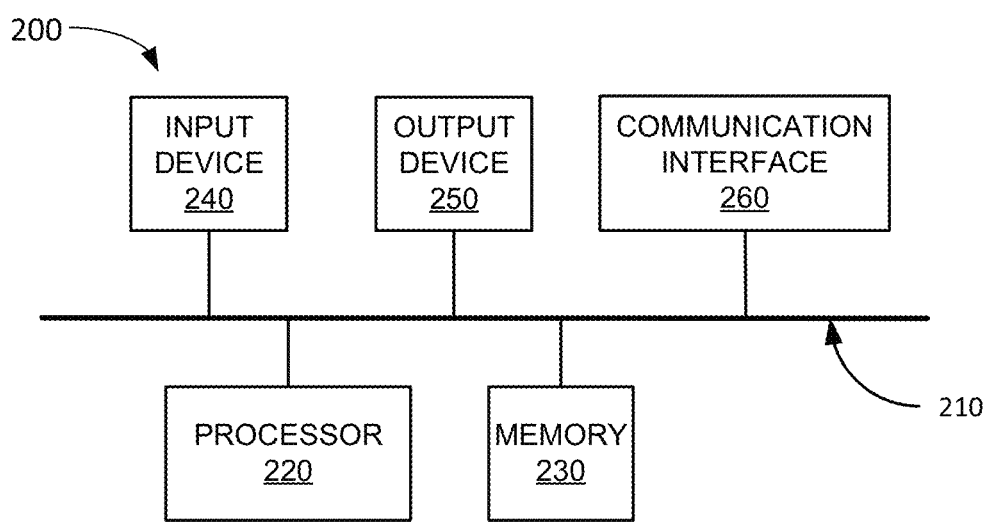
FIG. 2 is a diagram illustrating exemplary components of a device that may be included in a component of an environment according to an implementation described herein.

FIG. 2 illustrates example components of a device 200 according to an implementation described herein. UE device 110, legacy video device 120, video conferencing system 140 and/or other components of environment 100, may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to an adaptive method to enable buffering of video and/or audio data of passive users participating in a video conferencing session. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hard-wired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
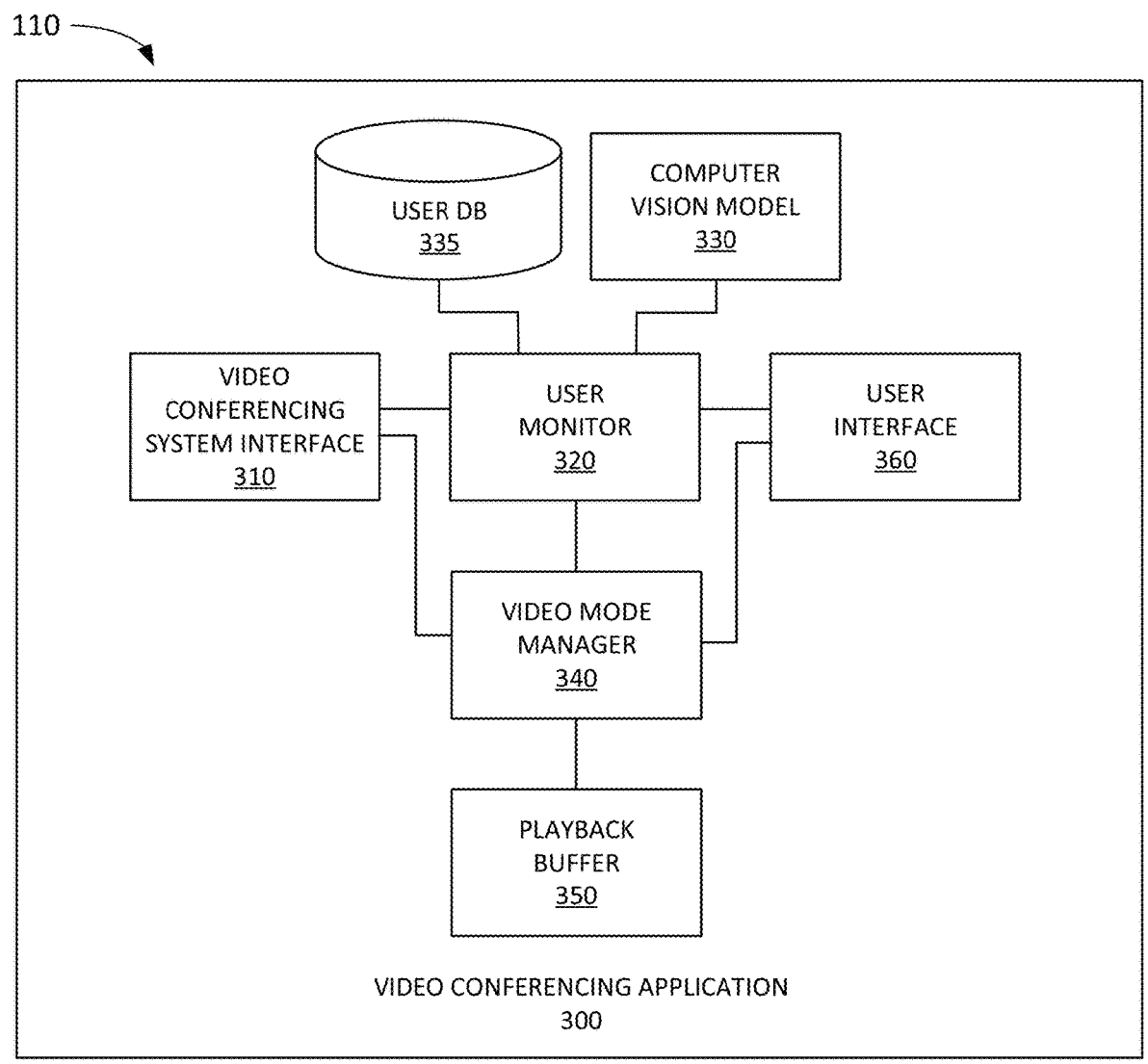
FIG. 3 is a diagram illustrating exemplary components of a user equipment (UE) device according to an implementation described herein.

FIG. 3 is a diagram illustrating exemplary components of UE device 110. The components of UE device 110 may be implemented, for example, via processor 220 executing instructions from memory 230. Alternatively, some or all of the components of UE device 110 may be implemented via hard-wired circuitry. As shown in FIG. 3, UE device 110 may include a video conferencing application 300 configured to enable a user of UE device 110 to participate in video conferencing sessions managed by video conferencing system 140. Video conferencing application 300 may include a video conferencing system interface 310, a user monitor 320, a computer vision model 330, a user database (DB) 335, a video mode manager 340, a playback buffer 350, and a user interface 360.

Video conferencing system interface 310 may be configured to communicate with video conferencing system 140. For example, video conferencing system interface 310 may send requests to video conferencing system 140 to initiate or join a video conferencing session, to send microphone and/or camera data captured by UE device 110 to video conferencing system 140, and/or to receive video and/or audio content from other users participating in the video conferencing session from video conferencing system 140.

User monitor 320 may monitor the user's behavior to determine whether a user is to be designated as an active user or a passive user. As an example, user monitor 320 may monitor a microphone setting to determine whether the user has muted or unmuted the microphone of UE device 110. As another example, user monitor 320 may monitor a camera setting to determine whether the user has turned on or turned off the camera of UE device 110. As yet another example, user monitor 320 may monitor video captured by the camera of UE device 110 using computer vision model 330 to determine whether the user has switched from being an active user to a passive user or has switched from being a passive user back to an active user.

Computer vision model 330 may be trained to identify whether the user has switched from being an active user to a passive user or has switched from being a passive user back to an active user. For example, computer vision model 330 may be trained using a set of data indicative of passive user behavior, such as, for example, the user not talking, the user not being focused on the user interface of video conferencing application 300, the user leaning away from the user interface, the user performing another activity while participating in the video conference, and/or another type of activity indicative of passive user behavior. As another example, computer vision model 330 may be trained using a set of data indicative of active user behavior, such as, for example, a user talking or getting ready to talk, a user expressing an interest to talk by raising a hand or performing another gesture, a user that was not previously focused on the user interface becoming focused on the user interface, and/or another type of activity indicative of active user behavior or a user switching from being a passive user to an active user. User DB 335 may store information relating to managing a passive user. Exemplary information that may be stored in user DB 335 is described below with reference to FIG. 5.

Video mode manager 340 may manage a video mode for a video conferencing session based on a determined status associated with the user and/or based on a determined status of a network connection. For example, video mode manager 340 may select to switch video conferencing application 300 from decoding and playing real-time video to decoding and playing buffered streaming video if the user is designated as a passive user. In some implementations, video mode selector 340 may only switch from playing real-time video to playing streaming video if the network connection quality is lower than a connection quality threshold. Thus, in some implementations, if the user is designated as a passive user but the network connection quality is higher than the connection quality threshold, video mode manager 340 may continue to decode and play content in real-time as it is being received.

For example, video mode manager 340 may monitor a latency associated with the user's network connection, a bandwidth associated with the user's network connection, a packet loss rate associated with the user's network connection, a jitter associated with the user's network connection, and/or one or more other measures of network connection quality and compare the determined values of network connection quality against a set of thresholds. For example, video mode manager 340 may determine a weighted average of a set of connection quality indicator values and compare the weighted average against a network quality threshold. If the weighted average exceeds the threshold, video mode manager 340 may select to switch from playing real-time video to playing streaming video.

Furthermore, video mode manager 340 slow down playback of received video content when filling playback buffer 350 and/or speed up play of received video content from playback buffer 350 when switching back to real-time video in order to catch up to the real-time video being received from video conferencing system 140. Video mode manager 340 may skip a period of silence in audio content and/or skip frames in video content stored in playback buffer 350 when switching back to real-time video in order to catch up to the real-time video. Video mode manager 340 may identify a packet as corresponding to a period of silence based on a voice activity detection (VAD) algorithm. Video manager 340 may identify video frames, such as a predicted picture frames (P-frames) and/or bidirectional predicted picture frames (B-frames), which are associated with a change (from a previous frame) that is less than a change threshold and select to skip the identified video frames.

Playback buffer 350 may store video content, associated with a video conferencing session, which has been received and not yet played by video conferencing application 300. User interface 360 may include a user interface associated with video conferencing application 300. For example, user interface 360 may include a section with a video feed from all the participants of a video conferencing session, a section that includes information identifying all the participants, and/or a section that includes a set of settings associated with the video conferencing application 300. The settings may include a microphone setting to mute and unmute a microphone, a camera setting to turn on or turn off a camera, and/or a setting to select to be designated as a passive user, respond to a prompt to become a passive user, and/or cancel a passive user designation.

Although FIG. 3 shows exemplary components of UE device 110, in other implementations, UE device 110 may include fewer components, different components, additional components, or differently arranged components than depicted in FIG. 3. Additionally, or alternatively, one or more components of UE device 110 may perform one or more tasks described as being performed by one or more other components of UE device 110.

Figure 4:
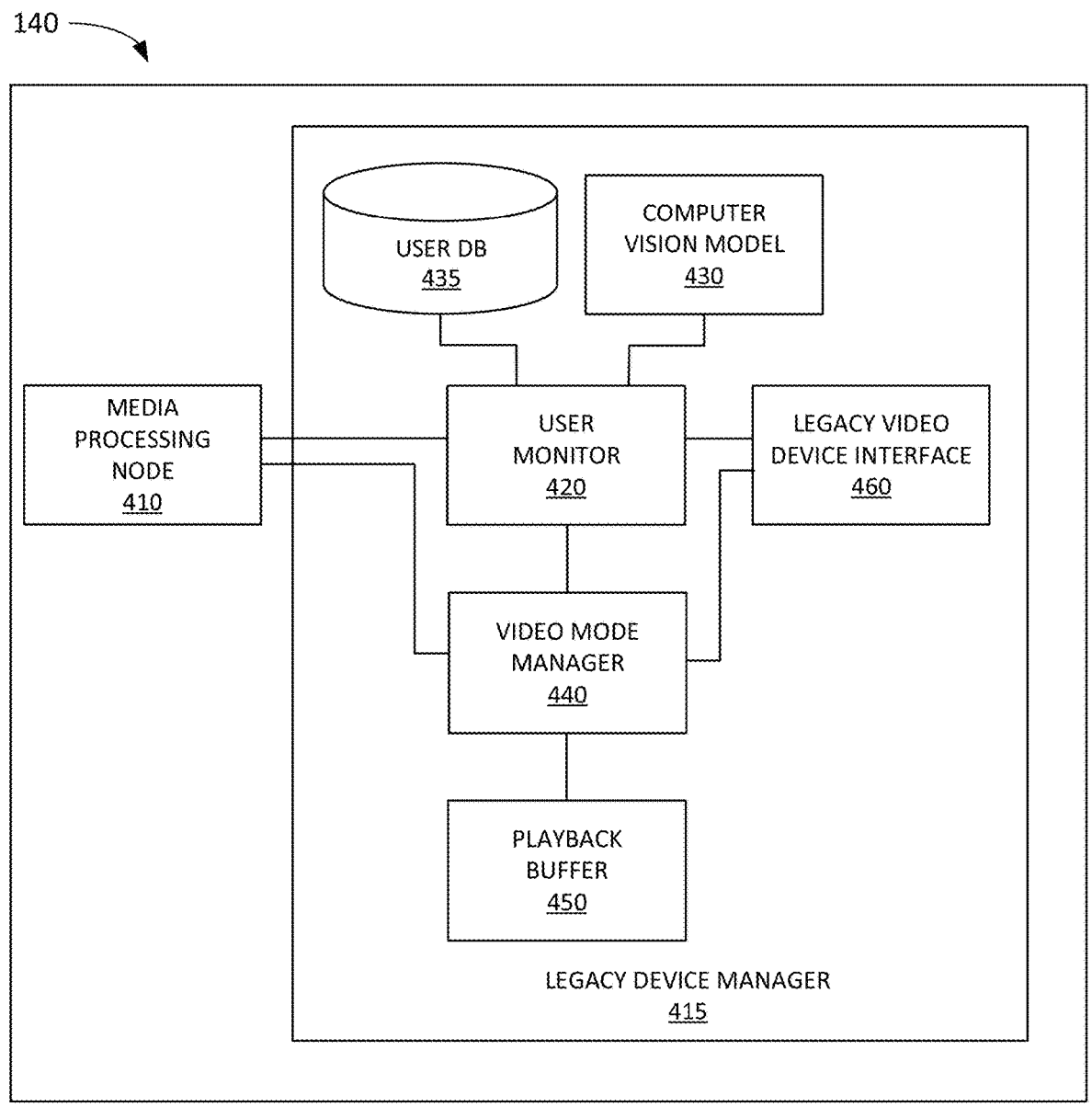
FIG. 4 is a diagram illustrating exemplary components of a video conferencing system according to an implementation described herein.

FIG. 4 is a diagram illustrating exemplary components of video conferencing system 140. The components of video conferencing system 140 may be implemented, for example, via processor 220 executing instructions from memory 230. Alternatively, some or all of the components of video conferencing system 140 may be implemented via hard-wired circuitry. As shown in FIG. 4, video conferencing system 140 may include a media processing node 410 and a legacy device manager 415.

Media processing node 410 may process and generate a combined video feed associated with all the participants of a video conferencing application for a particular user. For example, media processing node 410 may generate a video feed that includes the video feed from all the users and provide the video feed to a particular user.

Legacy device manager 415 may manage legacy video device 120 and perform functions similar to the functions described above with respect to video conferencing application 300 running on UE device 110. Legacy device manager 415 may include a user monitor 420, a computer vision model 430, a user DB 435, a video mode selector 440, a playback buffer 450, and a legacy video device interface 460.

User monitor 420, computer vision model 430, user DB 435, video mode manager 440, and playback buffer 450 may include functionality similar to the functionality described above for user monitor 320, computer vision model 330, user DB 335, video mode manager 340, and playback buffer 350, respectively with respect to FIG. 3. In some implementations, legacy video device 120 may include a playback buffer and playback buffer 450 may be implemented in legacy video device 120. Legacy video device interface 460 may be configured to communicate with legacy video device 120.

Although FIG. 4 shows exemplary components of video conferencing system 140, in other implementations, video conferencing system 140 may include fewer components, different components, additional components, or differently arranged components than depicted in FIG. 4. Additionally, or alternatively, one or more components of video conferencing system 140 may perform one or more tasks described as being performed by one or more other components of video conferencing system 140.

Figure 5:
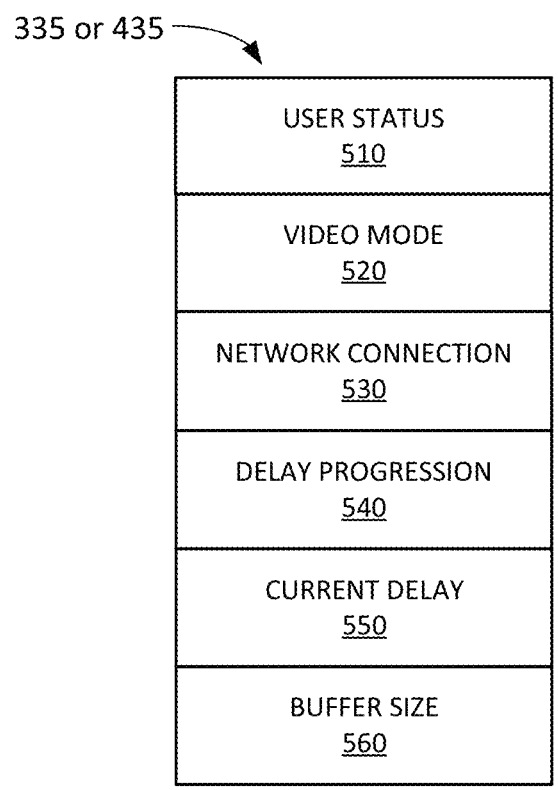
FIG. 5 is a diagram illustrating exemplary components of a user database according to an implementation described herein.

FIG. 5 is a diagram illustrating exemplary information stored in user DB 335 or 435. As shown in FIG. 5, user DB 335 or 435 may include a user status field 510, a video mode field 520, a network connection field 530, a delay progression field 540, a current delay field 550, and a buffer size field 560.

User status field 510 may store information identifying a current status associated with the user. For example, user status field 510 may store information identifying whether the user is designated as an active user or a passive user. Video mode field 520 may store information identifying a video mode associated with a video conferencing session associated with the user. For example, video mode field 520 may store information identifying whether video and/or audio being received by the user is to be processed as real-time video or as video streaming.

Network connection field 530 may store information relating to a quality of a network connection between UE device 110 and video conferencing system 140. For example, network connection field 530 may store information identifying a latency associated with the network connection, a bandwidth associated with the network connection, a throughput associated with the network connection, a jitter (e.g., packet delay variation) associated with the network connection, a packet loss rate associated with the network connection, and/or another type of metric used to determine the quality of a network connection. The information stored in network connection field 530 may be used to determine whether a user's experience would improve by switching to client-side buffering. Furthermore, the information stored in network connection field 530 may be used to select a delay progression profile when switching to client-side buffering.

Delay progression field 540 may store one or more delay progression profiles that may be used when switching a passive user to buffered video streaming from real-time video. As an example, different delay progression profiles may be associated with different network connection quality ranges. As another example, different delay progression profiles may be associated with different ranges in the numbers of participants. For example, a video conference session with a large number of participants may be associated with a lower likelihood that a user will switch from being a passive user to an active user. In such situations, a longer delay between received and played content may be permissible and thus a delay progression profile with a longer delay may be selected. Each delay progression profile may specify a delay value and a progression to reach the delay value. For example, a delay progression profile may specify a delay value of one second and progression time period of four seconds to reach the full delay of one second. During the progression time period, video conferencing application 300 may slow down playback of content to 0.75 times the normal playback speed, for example, while playback buffer 350 is filled. Current delay field 550 may store information identifying a current delay between received content and played content. Buffer size field 560 may store information identifying the amount of received content currently stored in playback buffer 350.

Although FIG. 5 shows exemplary components of user DB 335 or 435, in other implementations, user DB 335 or 435 may include fewer components, different components, additional components, or differently arranged components than depicted in FIG. 5.

Figure 6:
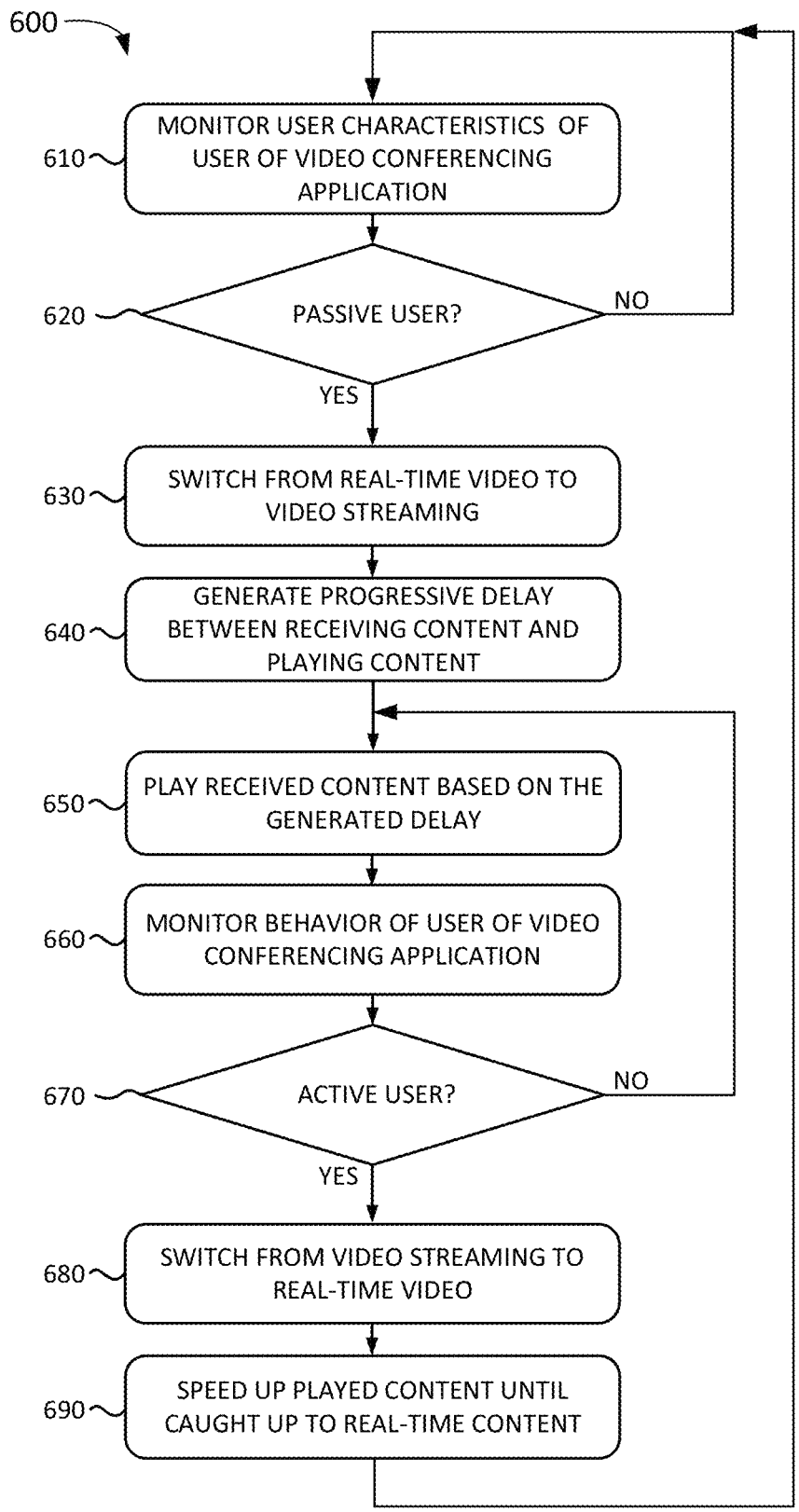
FIG. 6 illustrates a flowchart for managing a video conferencing session for a user with unreliable network connection according to an implementation described herein.

FIG. 6 illustrates a flowchart of a process 600 for managing a video conferencing session for a user with an unreliable network connection according to an implementation described herein. In some implementations, process 600 of FIG. 6 may be performed by UE device 110 and/or video conferencing system 140. In other implementations, some or all of process 600 may be performed by another device or a group of devices separate from UE device 110 and/or video conferencing system 140.

As shown in FIG. 6, process 600 may include monitoring user characteristics of a user of a video conferencing application (block 610) and a determination may be made as to whether the user is a passive user (block 620). For example, video conferencing application 300 running on UE device 110 may monitor to determine whether the user has muted the microphone (or that the mute setting has been active for a threshold period of time), turned off the camera (or that the camera has been turned off for a threshold period of time), and/or use computer vision model 330 to analyze video of the user captured by the camera to determine whether the user is exhibiting behavior indicative of a passive user. Video conferencing application 300 may then prompt the user to have the user select to be designated as a passive user.

In some implementations, video conferencing application 300 may also determine the quality of the network connection between UE device 110 (or legacy video device 120) and video conferencing system 140. If the user is determined to correspond to a passive user but the network connection quality is higher than a quality threshold, video conferencing application 300 may determine that the user's experience would not improve by activating client-side buffering of video and may not prompt the user to have the user select to be designated as a passive user. In other implementations, the user may be prompted to select to be designated as a passive user even if the network connection quality is determined to be higher than the quality threshold. In yet other implementations, if the user is determined to correspond to a passive user and the network connection quality is lower than the quality threshold, the user may be automatically designated as a passive user without prompting the user to select to be designated as a passive user.

A user may start out as an active user when initially joining a video conferencing session. The user may be determined to be a passive user based on the behavior of the user during the video conferencing session. Additionally, in some implementations, the user may select to become a passive user without video conferencing application 300 first determining that the user has become a passive user based on the user's behavior. For example, a user may select to not actively participate in the video conferencing session and may activate a selection item available in the user interface to become a passive user and switch from real-time video to buffered streaming video in order to experience better video and/or audio quality.

If it is determined that the user is not a passive user (block 620—NO), processing may return to block 610 to continue to monitor the user's behavior. If it is determined that the user is a passive user (block 620—YES), a switch may be made from real-time video to video streaming (block 630), generating a progressive delay between receiving content and playing the content (block 640), and playing received content based on the generated delay (block 650). For example, video conferencing application 300 may select a delay progression profile and generate a delay between receiving content and decoding and playing the content while filling playback buffer 350. Video conferencing application 300 may slow down the playback of the received video and/or audio content while filling playback buffer 350. For example, video conferencing application 300 may play content slowed down (e.g., slowed down to a speed anywhere from 0.75 times to 1.0 times the normal playback speed, depending on a particular implementation) while filling playback buffer 350.

In some implementations, video conferencing application 300 may set multiple levels of passivity and set a size of the playback buffer based on a determined level of passivity. For example, if a user's behavior indicates, based on computer vision analysis, that the user is not paying attention to the video feed at all, the user may be designated as a fully passive user, and if the user's behavior indicates that the user is paying attention to the video feed a particular percentage of the time, the user may be designated as a partially passive user. The playback buffer size for a fully passive user may be set to a first size and the playback buffer size for a partially passive user may be set to a second size, where the first size is larger than the second size. Additionally, or alternatively, the speed which the playback buffer is filled for a fully passive user may be set to a first speed and the speed at which the playback buffer is filled for a partially passive user may be set to a second speed, where the first speed is slower than the second speed.

In some implementations, video conferencing application 300 may communicate with video conferencing system 140 to change a Class of Service (CoS) associated with the communication session between UE device 110 and video conferencing system 140. For example, video conferencing application 300 may request that the CoS of the communication session be changed from real-time video to video streaming and remain as a video streaming CoS session while the user is designated as a passive user.

Process 600 may further include monitoring the behavior of a user of a video conferencing application (block 660) and determination may be made as to whether the user is an active user (block 670). For example, video conferencing application 300 running on UE device 110 may monitor to determine whether the user has unmuted the microphone, turned on the camera, and/or use computer vision model 330 to analyze video, of the user, captured by the camera to determine whether the user is exhibiting behavior indicative of an active user or a passive user switching to an active user. Video conferencing application 300 may then designate the user as an active user.

If it is determined that the user is not an active user (block 670—NO), processing may return to block 650 to continue to monitor the user's behavior. If it is determined that the user is an active user (block 670—YES), a switch may be made from video streaming to real-time video (block 680), and the played content may be sped up until caught up to the real-time content (block 690). For example, video conferencing application 300 may speed up the playback of the received video and/or audio content to empty playback buffer 350. For example, video conferencing application 300 may play content at a speed of up to 1.25 times the normal playback speed while emptying playback buffer 350. Furthermore, video conferencing application 300 may skip periods of silence in audio content and/or skip frames in video stored in playback buffer 350 when switching back to real-time video in order to catch up to the real-time video.

Figure 7:
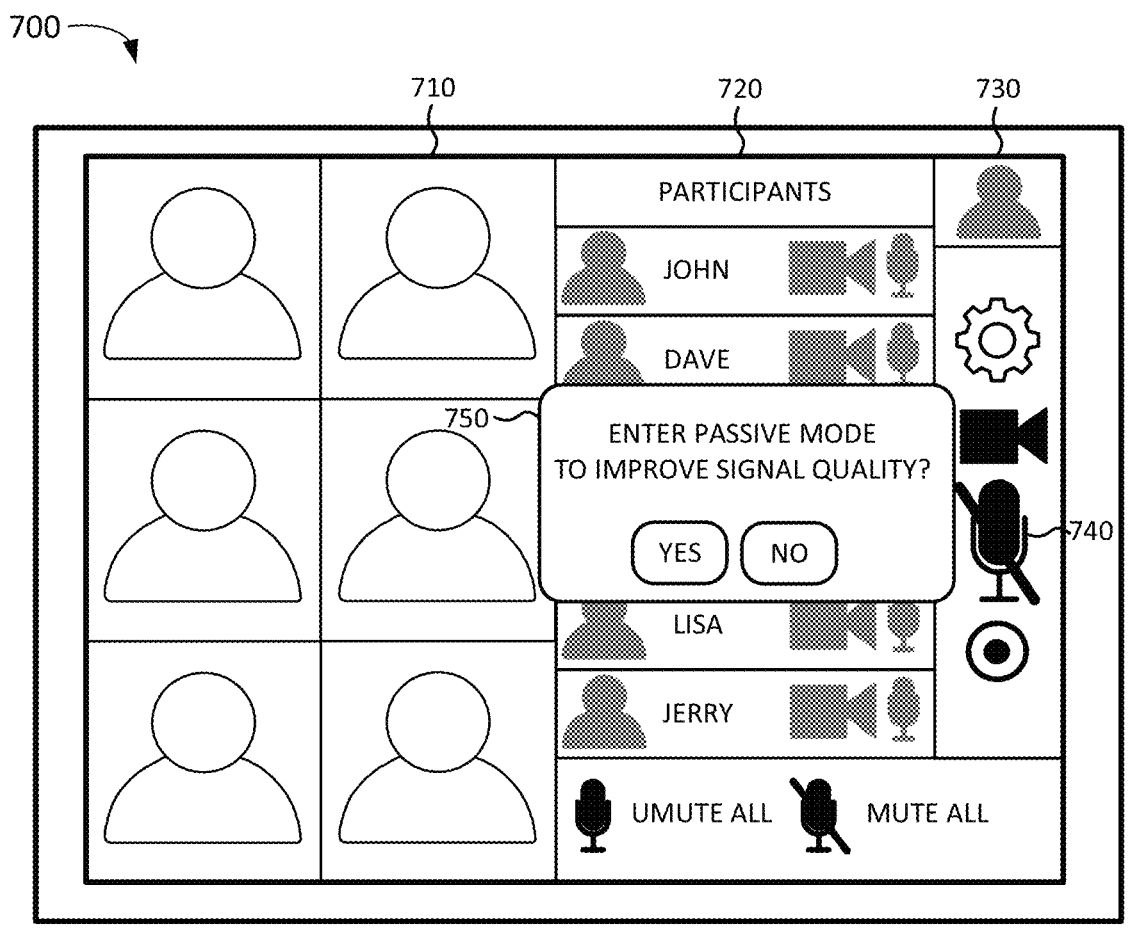
FIG. 7 illustrates an exemplary user interface according to an implementation described herein.

FIG. 7 illustrates an exemplary user interface 700 according to an implementation described herein. As shown in FIG. 7, user interface 700 may include a video feed section 710, a participants section 720, and a settings section 730. Video feed section 710 may include video feeds from users participating in a video conference session. Participants section 720 may include information relating to the participants of the video conference session. Settings section 730 may include a set of settings for the video conference session. Settings section 730 may include a microphone setting 740 that enables the user to mute and unmute a microphone. If video conferencing application 300 detects that the user has muted the microphone using microphone setting 740, video conferencing application 300 may determine that the user has become a passive user and may, in response, generate a prompt 750 asking the user to select whether the user would like to be designated a passive user. If the user confirms that the user would like to be designated a passive user, video conferencing application 300 may designate the user as a passive user, switch from playing video in real time to playing buffered video, and initiate a progressive delay between received content and played content associated with the video conferencing session.

FIG. 8 illustrates an exemplary table 800 associated with a switch from real-time video to video streaming according to an implementation described herein. As shown in FIG. 8, table 800 includes a time column 810, a received packets column 820, a played packets column 830 and a playback buffer column 840. At time T, UE device 110 may be participating in a video conferencing session and be receiving real-time video and audio from the other UE devices 110 and/or legacy video devices 120 participating in the video conferencing session. Furthermore, at time T video conferencing application 300 running on UE device 110 may determine that the user has become a passive user and switch from real-time video to streaming video. Video conferencing application 300 may initiate a progressive delay between the received and played packets by slowing down the playback rate to 0.75 times the normal playback rate and start filling playback buffer 350. During each progressive time period, the size of the playback buffer may increase as the delay between the received packets and the played packets increases until a particular preconfigured delay is reached.

FIG. 9 illustrates an exemplary table 900 associated with a switch from video streaming to real-time video according to an implementation described herein. As shown in FIG. 9, table 900 includes a time column 910, a received packets column 920, a played packets column 930 and a playback buffer column 940. At time T+X, the user of UE device 110 may switch from being a passive user to an active user. For example, video conferencing application 300 may detect that the user is preparing to speak based on a computer vision analysis of the video captured by the camera of UE device 110 and may, in response, change the user status from passive to active. Video conferencing application 300 may then switch from streaming video back to real-time video and speed up the playback of content from playback buffer 350 to catch up to the real-time video. For example, video conferencing application 300 may speed up the playback up to 1.25 times the normal playback rate and start emptying out playback buffer 350.

Furthermore, video conferencing application 300 may keep track of packets that correspond to a period of silence in audio content and/or video frames that change less than a threshold amount of change from a previous video frame. Video conferencing application 300 may skip packets corresponding to a period of silence in the audio content or a change less than the threshold in the video content. For example, video conferencing application 300 may skip packets 864 to 909 between time period T+X+2 and T+X+3 s shown in FIG. 9 in order to catch up faster to the real-time video.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 6, the order of the blocks may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    monitoring, by a computer device, a user of a video conferencing application;
    determining, by the computer device, that the user corresponds to a passive user based on the monitoring;
    switching, by the computer device, a setting for the video conferencing application for the user from real-time video to video streaming, in response to determining that the user corresponds to a passive user;
    generating, by the computer device, a delay between receiving content via the video conferencing application and playing the content by the video conferencing application, wherein the delay progressively increases from no delay to a particular delay value over a time period, in response to switching the setting for the video conferencing application for the user from real-time video to video streaming; and
    playing, by the computer device, the received content using the video conferencing application based on the generated delay.

2. The method of claim 1, wherein playing the received content using the video conferencing application based on the generated delay includes:
    storing the received content in a buffer before playing the content by the video conferencing application; and
    playing the received content from the buffer using the video conferencing application.

3. The method of claim 1, wherein determining that the user corresponds to a passive user based on the monitoring includes:
    detecting that the user has activated a mute setting.

4. The method of claim 1, wherein determining that the user corresponds to a passive user based on the monitoring includes:
    determining that the user is a passive user using a computer vision analysis of a video stream of the user captured by a camera.

5. The method of claim 1, wherein determining that the user corresponds to a passive user based on the monitoring includes:
    prompting the user to select a passive mode; and
    receiving a selection of the passive mode from the user.

6. The method of claim 1, wherein playing the received content using the video conferencing application based on the generated delay includes:
    determining that a packet in the received content has been corrupted; and
    requesting that the packet be re-sent, in response to determining that the packet in the received content has been corrupted.

7. The method of claim 1, further comprising:
    determining that the user has switched from being a passive user to an active user; and
    switching the setting for the video conferencing application for the user from video streaming to real-time video, in response to determining that the user has switched from being a passive user to an active user.

8. The method of claim 7, wherein determining that the user has switched from being a passive user to an active user includes at least one of:
   detecting that the user has deactivated a mute setting, or
   determining that the user has switched from being a passive user to an active user using a computer vision analysis of a video stream of the user captured by a camera.

9. The method of claim 7, further comprising:
   speeding up the playing of the received content using the video conferencing application until the content being played is caught up to the real-time video received via the video conferencing application.

10. The method of claim 7, wherein speeding up the playing of the received content using the video conferencing application includes:
   skipping a period of silence in an audio stream included in the received content.

11. The method of claim 7, wherein speeding up the playing of the received content using the video conferencing application includes:
   skipping a video frame included in the received content.

12. A device comprising:
   a processor configured to:
      monitor a user of a video conferencing application;
      determine that the user corresponds to a passive user based on the monitoring;
      switch a setting for the video conferencing application for the user from real-time video to video streaming, in response to determining that the user corresponds to a passive user;
      generate a delay between receiving content via the video conferencing application and playing the content by the video conferencing application, wherein the delay progressively increases from no delay to a particular delay value over a time period, in response to switching the setting for the video conferencing application for the user from real-time video to video streaming; and
      play the received content using the video conferencing application based on the generated delay.

13. The device of claim 12, wherein, when determining that the user corresponds to a passive user based on the monitoring, the processor is further configured to at last one of:
   detect that the user has activated a mute setting, or
   determine that the user is a passive user using a computer vision analysis of a video stream of the user captured by a camera.

14. The device of claim 12, wherein, when determining that the user corresponds to a passive user based on the monitoring, the processor is further configured to at last one of:
   prompt the user to select a passive mode; and
   receive a selection of a passive mode from the user.

15. The device of claim 12, wherein, when playing the received content using the video conferencing application based on the generated delay the processor is further configured to:
   determine that a packet in the received content has been corrupted; and
   request that the packet be re-sent, in response to determining that the packet in the received content has been corrupted.

16. The device of claim 12, wherein the processor is further configured to:
   determine that the user has switched from being a passive user to an active user; and
   switch the setting for the video conferencing application for the user from video streaming to real-time video, in response to determining that the user has switched from a being passive user to an active user.

17. The device of claim 16, wherein, when determining that the user has switched from being a passive user to an active user, the processor is further configured to at least one of:
   detect that the user has deactivated a mute setting, or
   determine that the user has switched from being a passive user to an active user using a computer vision analysis of a video stream of the user captured by a camera.

18. The device of claim 16, wherein the processor is further configured to:
   speed up the playing of the received content using the video conferencing application until the content being played is caught up to the real-time video received via the video conferencing application.

19. The device of claim 18, wherein, when speeding up the playing of the received content using the video conferencing application, the processor is further configured to at least one of:
   skip a period of silence in an audio stream included in the received content, or
   skip a video frame included in the received content.

20. A non-transitory computer-readable memory device storing instructions executable one a processor, the non-transitory computer-readable memory device comprising:
   one or more instructions to monitor a user of a video conferencing application;
   one or more instructions to determine that the user corresponds to a passive user based on the monitoring;
   one or more instructions to switch a setting for the video conferencing application for the user from real-time video to video streaming, in response to determining that the user corresponds to a passive user;
   one or more instructions to generate a delay between receiving content via the video conferencing application and playing the content by the video conferencing application, wherein the delay progressively increases from no delay to a particular delay value over a time period, in response to switching the setting for the video conferencing application for the user from real-time video to video streaming; and
   one or more instructions to play the received content using the video conferencing application based on the generated delay.

* * * * *